United States Patent
Bryant et al.

(10) Patent No.: US 9,776,472 B2
(45) Date of Patent: Oct. 3, 2017

(54) BODY VENT PROTECTOR

(71) Applicant: Honda Motor Co., Ltd., Tokyo (JP)

(72) Inventors: David Bryant, Dublin, OH (US); Jerome Schafer, Hilliard, OH (US); Andrew T. Goeppner, Dublin, OH (US); Keiji Maruyama, Haga-machi (JP)

(73) Assignee: Honda Motor Co., Ltd., Tokyo (JP)

( * ) Notice: Subject to any disclaimer, the term of this patent is extended or adjusted under 35 U.S.C. 154(b) by 384 days.

(21) Appl. No.: 14/480,669

(22) Filed: Sep. 9, 2014

(65) Prior Publication Data

US 2016/0068038 A1    Mar. 10, 2016

(51) Int. Cl.
*B60H 1/24* (2006.01)
*B60H 1/26* (2006.01)

(52) U.S. Cl.
CPC ..................... *B60H 1/26* (2013.01)

(58) Field of Classification Search
CPC ....................................................... B60H 1/26
USPC ........................................................ 454/164
See application file for complete search history.

(56) References Cited

U.S. PATENT DOCUMENTS

| | | | |
|---|---|---|---|
| 3,520,243 A * | 7/1970 | Wessells | B60H 1/248 454/164 |
| 4,144,803 A | 3/1979 | Götz et al. | |
| 4,667,578 A | 5/1987 | Hagenah | |
| 5,205,781 A | 4/1993 | Kanno et al. | |
| 5,695,397 A | 12/1997 | Frank et al. | |
| 6,409,591 B1 | 6/2002 | Sullivan et al. | |
| 7,503,843 B1 | 3/2009 | Wilmoth | |
| 2005/0227607 A1 * | 10/2005 | Stevenson | B60H 1/249 454/164 |
| 2009/0111371 A1 | 4/2009 | Niezur et al. | |
| 2010/0130116 A1 | 5/2010 | Nakayama | |
| 2013/0309956 A1 | 11/2013 | Mouch et al. | |
| 2014/0011440 A1 | 1/2014 | Savchenko et al. | |
| 2014/0057543 A1 | 2/2014 | Kim et al. | |

FOREIGN PATENT DOCUMENTS

| | | |
|---|---|---|
| EP | 0365395 | 4/1990 |
| KR | 20030049071 | 6/2003 |

* cited by examiner

*Primary Examiner* — Helena Kosanovic
(74) *Attorney, Agent, or Firm* — Rankin, Hill & Clark LLP

(57) ABSTRACT

A body vent protector assembly for a vehicle includes a venting port defined into a body underlying surface on the vehicle and a body vent protector disposed at the venting port for inhibiting undesirable matter from interfering with the venting port. The body vent protector includes a shroud disposed over at least a portion of the venting port and a blocking rib disposed at or adjacent a rear edge of the venting port for blocking the undesirable matter.

18 Claims, 4 Drawing Sheets

BODY VENT PROTECTOR

BACKGROUND

Vehicles sometimes include one or more vehicle cabin vents. Such vents can be used to allow air to move between the interior and exterior of the vehicle for a variety of purposes, including for example pressure equalization (such as when doors are shut on the vehicle), HVAC performance, etc. One further use of such vents is in connection with audio speakers for purposes of allowing maximum performance of a particular audio speaker. Prior vents typically include seal flaps that prevent debris and/or air from entering the cabin most of the time. A concern with known venting arrangements involves blockage and/or interference due to undesirable matter reaching the vent (e.g., ice and/or snow buildup).

SUMMARY

According to one aspect, a body vent protector assembly for a vehicle includes a venting port defined into a body underlying surface on the vehicle and a body vent protector disposed at the venting port for inhibiting undesirable matter from interfering with the venting port. The body vent protector includes a shroud disposed over at least a portion of the venting port and a blocking rib disposed at or adjacent a rear edge of the venting port for blocking the undesirable matter.

According to another aspect, a body vent protector mounted on a vehicle includes a shroud disposed over at least a portion of a venting port defined by a body underlying surface on the vehicle for inhibiting undesirable matter from interfering with the venting port and a blocking rib disposed at or adjacent a rear edge of the venting port for further inhibiting undesirable matter from interfering with the venting port.

According to a further aspect, a body vent protector for a vehicle includes a blocking rib and a shroud. The blocking rib is arranged to extend vertically along a rear side of a venting port defined into the vehicle. The shroud is positioned laterally over an entire area of the venting port. The shroud and the blocking rib together close the rear side and an upper side of the venting port.

DETAILED DESCRIPTION

Figure 1:
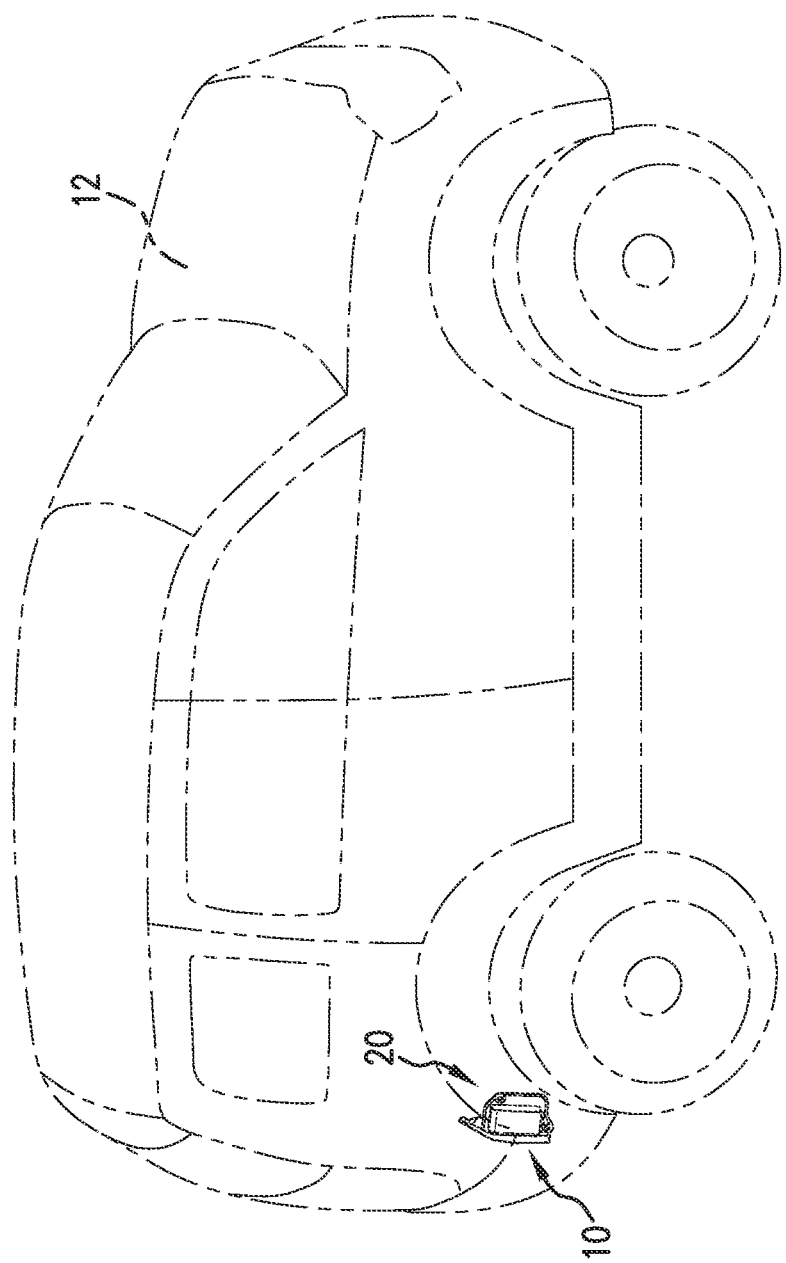
FIG. 1 is a perspective view of a vehicle having a body vent protector assembly including a venting port and a body vent protector according to an exemplary embodiment.
Figure 2:
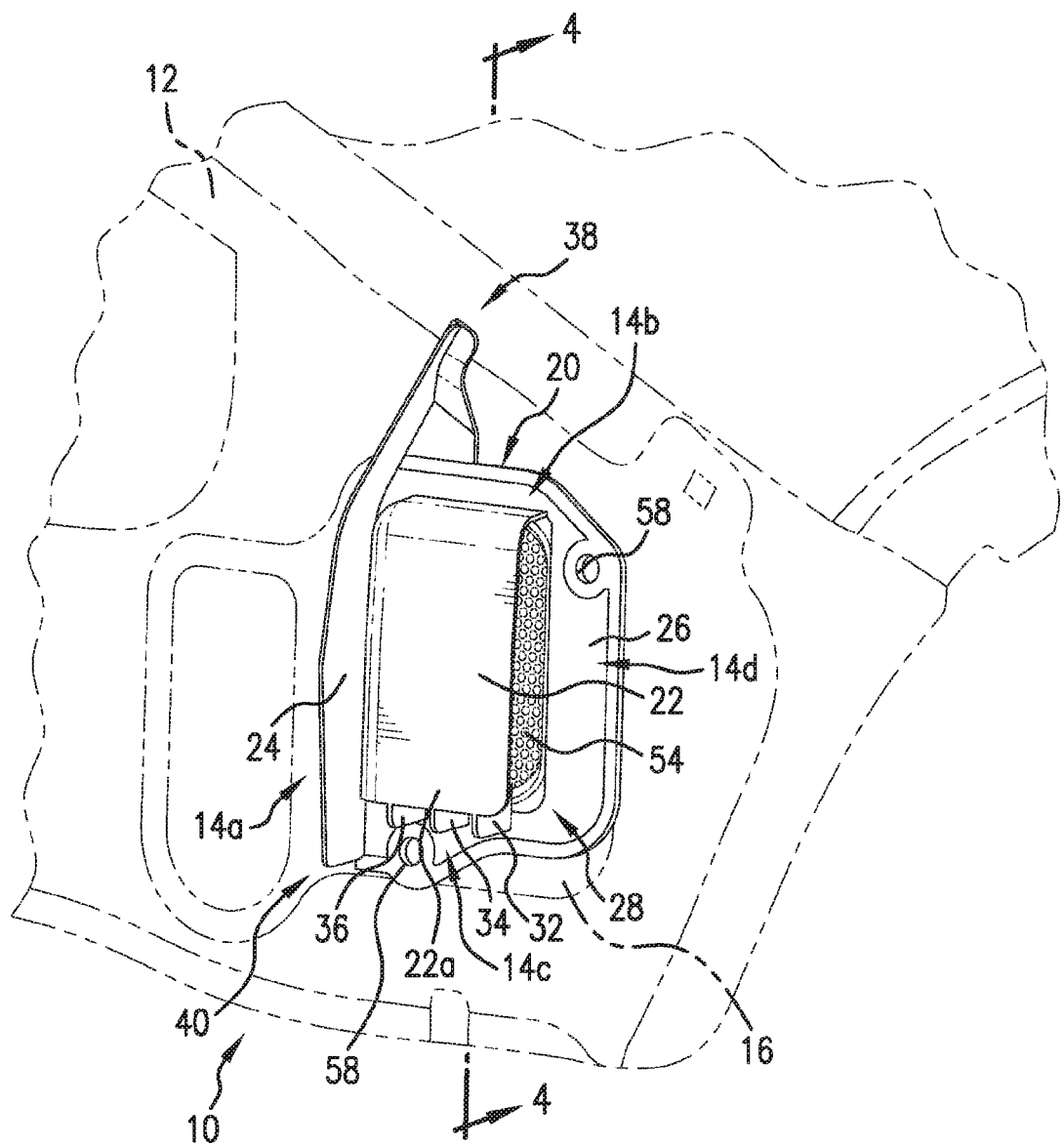
FIG. 2 is an enlarged partial perspective view of the body vent protector assembly of FIG. 1.
Figure 3:
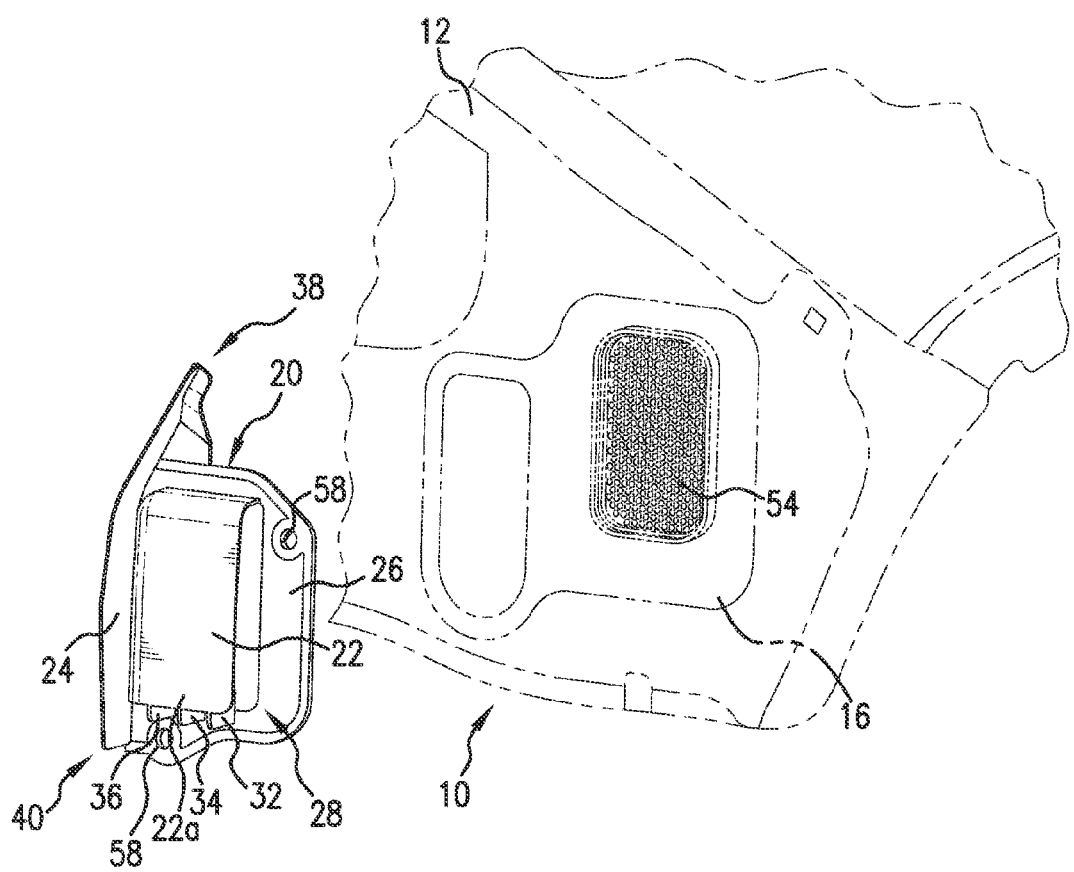
FIG. 3 is an exploded partial perspective view showing the body vent protector separated from the vehicle

With reference now to the drawings, wherein the showings are for purposes of illustrating one or more exemplary embodiments and not for purposes of limiting the same, FIGS. 1-4 show a body vent protector assembly 10 for a vehicle 12 (schematically illustrated in FIG. 1) according to an exemplary embodiment. The body vent protector assembly 10 includes a venting port 14 (FIGS. 3 and 4) defined into a body underlying surface 16 on the vehicle 12. The body vent protector assembly 10 further includes a body vent protector 20 disposed at the venting port 14 for inhibiting undesirable matter from interfering with the venting port 14 as will be described in further detail below.

The body vent protector 20 is mounted on the vehicle 12 and includes a shroud 22 and a blocking rib 24. The shroud 22 is disposed over at least a portion of the venting port 14 defined by the body underlying surface 16 on the vehicle 12 for inhibiting undesirable matter from interfering with the venting port 14. In particular, the blocking rib 24 is disposed at or adjacent a rear side or edge area 14a of the venting port 14 for blocking and/or further inhibiting undesirable matter from interfering with the venting port 14. More specifically, the blocking rib 24 is arranged to extend vertically along the rear edge area 14a of the venting port 14 defined into the vehicle 12. The blocking rib 24 extends orthogonally away from a plane in which the venting port 14 is defined. As shown, the shroud 22 is positioned laterally over an entire area of the venting port 14 in the illustrated embodiment. The shroud 22 and the blocking rib 24 together close the rear edge area 14a and an upper side or edge area 14b of the venting port 14. That is, a shroud 22 and the blocking rib 24 prevent any undesirable matter from entering the venting port 14 directly at the rear edge area 14a or the upper edge area 14b of the venting port 14. As will be described in more detail below, the shroud 22 covers an entirety of a vertical area of the venting port 14 and together with the blocking rib 24 permits airflow communication with the venting port 14 from both a lower edge area 14c of the venting port 14 and a front edge area 14d of the venting port 14 with an outward facing side of the venting port 14 while preventing airflow from the rear edge area 14a and the top edge area 14b. As shown, the lower edge area 14c is spaced vertically on the vehicle 12 lower than the upper edge area 14b and the front edge area 14d is spaced horizontally on the vehicle 12 forward of the rear edge area 14a.

The body vent protector 20 further includes a faceplate 26 adapted to mount against the body underlying surface 16. In particular, the faceplate 26 can be mounted in abutting relation to the body underlying surface 16. Additionally, the faceplate 26 can surround the venting port 14. The faceplate 26 of the illustrated embodiment includes mounting apertures 58 that can be used for securing the body vent protector to the body underlying surface 16 via fasteners, such as bolts or other types of fasteners (not shown). In the illustrated embodiment, the faceplate 26, the shroud 22, and the blocking rib 24 are integrally formed and together define an aperture 28 open only in forward and lower directions relative to the venting port 14. As shown, the blocking rib 24 extends or projects orthogonally from the faceplate 26. In particular, the blocking rib 24 extends orthogonally from the faceplate 26 in a direction away from the body underlying surface 16. The shroud 22 extends from the faceplate 26 in the same lateral direction as the blocking rib 24 (i.e., in a direction away from the body underlying surface 16).

The body vent protector 20 can further include a lead-in wall portion or structure 30 (FIG. 4) extending from the faceplate 26 into the venting port 14 and a plurality of lower ribs 32, 34, 36 (also referred to herein as lower side ribs). As shown, the lead-in structure 30 extends orthogonally from the faceplate 26 into the venting port 14. The lower side ribs 32, 34, 36 extend from the faceplate 26 to the shroud 22 at or adjacent the lower side or edge area 14c of the venting port 14. The lower side ribs 32, 34, 36 are horizontally spaced apart from one another and positioned forward of the blocking rib 24. Thus, the lower side ribs 32, 34, 36 are disposed in horizontally spaced apart relation along the lower edge area 14c of the venting port 14 with each of the lower side ribs 32, 34, 36 extending from the faceplate 26 to a lower distal edge 22a of the shroud 22.

As shown in the illustrated embodiment, the blocking rib 24 extends along an entirety of a vertical height of the venting port 14. In particular, the vertical height of the venting port 14 is defined between the upper edge area 14b and the lower edge area 14c. In particular, in the illustrated embodiment, the blocking rib 24 extends along an entirety of the vertical height of the venting port 14 at the rear edge area 14a. As shown in the illustrated embodiment, this dimension can be the same as that between the upper edge area 14b and the lower edge area 14c at a front side or edge area 14d of the venting port 14, though this is not required. Additionally, the blocking rib 24 extends upward and below the entirety of the vertical height of the venting port 14. More specifically, the blocking rib 24 can extend to one of an upper location 38 spaced apart vertically from and above the upper edge area 14b of the venting port 14 and a lower location 40 spaced apart vertically from and below a lower edge area 14c of the venting port 14. More particularly, in the illustrated embodiment, the blocking rib 24 extends to both the upper location 38 and the lower location 40 and additionally is integrally formed and connected to the shroud 22, though other configurations could be used.

Figure 4:
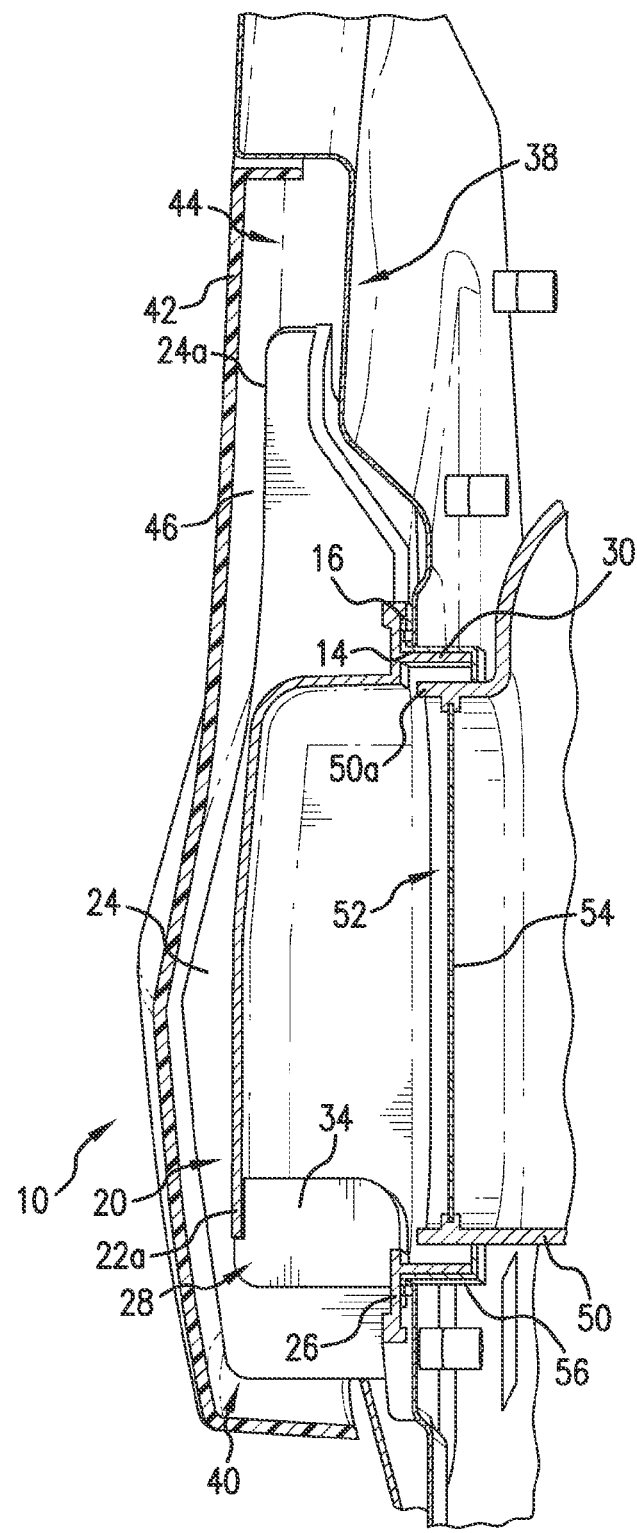
FIG. 4 is a cross-sectional view taken at the line 3-3 of FIG. 2 and shown with a fascia member installed.

As best shown in FIG. 4, the body vent protector assembly 10 can additionally include a fascia member 42 mounted to the vehicle 12 and covering the body underlying surface 16 and the venting port 14. More specifically, and with particular reference to the illustrated embodiment, the body underlying surface 16 defines a recess 44 in which the fascia member 42 is accommodated. As also best shown in FIG. 4, the blocking rib 24 extends away from the plane of the venting port 14 and laterally toward the fascia member 42, and particularly to a location closely adjacent and slightly spaced apart laterally from the fascia member 42, thereby defining a small gap 46 between a distal edge 24a of the blocking rib 24. The gap 46 allows air flow entering between the body underlying surface 16 and a fascia member 42, and particularly airflow entering rearward of the venting port 14, to pass between the fascia member 42 and the blocking rib 24. The gap 46 is sized such that airflow can occur but most undesirable matter is blocked and/or at least inhibited from passing by the blocking rib 24 and interfering with operation of the venting port 14.

As shown, the shroud 22 can cover an entirety of a vertical area of the venting port 14. Likewise, the shroud 22 can cover an entirety of a horizontal area of the venting port 14. More particularly, in the illustrated embodiment, the shroud 22 has an area approximately the same as or greater than a cross-sectional area of the venting port 14. By this arrangement, the shroud 22 together with the blocking rib 24 permits airflow communication with the venting port 14 from the lower edge area 14c of the venting port 14 and/or the front edge area 14d of the venting port 14 (i.e., and only from these edge areas 14c, 14d and thus not from the edge areas 14a and 14b).

The body vent protector assembly 10 of the illustrated embodiment further includes a port structure 50 defining a port 52. In one embodiment, the port structure 50 is an audio speaker part or component that provides for improved porting and thereby operation of an audio speaker (not shown) provided on the vehicle 12. As shown, the port structure 50 includes a projecting portion 50a that is received in the venting port 14 of the body underlying surface 16 and received in the lead-in wall portion or structure 30 of the body vent protector 20. A screen or mesh structure 54 can be mounted to the port structure 50 on the projecting portion 50a thereof. The screen 54 can further function to inhibit and/or prevent undesirable matter from entering the venting port 14 and interfering with the audio speaker.

If desired, the lead-in structure 30 can be secured and/or fitted to the port structure 50. In the illustrated embodiment, the body vent protector assembly 10 further includes a mounting adapter 56 that secures the lead-in structure 30 of the body vent protector 20 to the projecting portion 50a of the port structure 50. It is to be appreciated by those skilled in the art that other parts and/or arrangements can be used for securing the lead-in structure 30 to the port structure 50. For example, an interference fit could be provided between the lead-in structure 30 and the port structure 50, fasteners could be used to secure one component to the other, etc.

It will be appreciated that various of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A body vent protector assembly for a vehicle, comprising:
   a venting port defined into a body underlying surface on the vehicle; and
   a body vent protector disposed at the venting port for inhibiting undesirable matter from interfering with the venting port, the body vent protector including a shroud statically disposed over at least a portion of the venting port and a blocking rib disposed at or adjacent a rear edge area of the venting port for blocking the undesirable matter;
   wherein the shroud covers an entirety of a vertical area of the venting port and together with the blocking rib permits airflow communication with the venting port from both a lower edge area of the venting port and a front edge area of the venting port with an outward facing side of the venting port while preventing airflow from the rear edge area and a top edge area, wherein the lower edge area is spaced vertically on the vehicle lower than the upper edge area and the front edge area is spaced horizontally on the vehicle forward of the rear edge area.

2. The body vent protector assembly of claim 1 wherein the blocking rib extends along an entirety of a vertical height of the venting port, wherein the vertical height is parallel to a height dimension of the vehicle.

3. The body vent protector assembly of claim 2 wherein the blocking rib extends to one of an upper location spaced apart from an upper side of the venting port and a lower location spaced apart from a lower side of the venting port, wherein the upper side is located vertically above the lower side along the height of the vehicle.

4. The body vent protector assembly of claim 3 wherein the blocking rib extends to both the upper location and the lower location and is integrally formed and fixedly connected to the shroud.

5. The body vent protector assembly of claim 1 further including:
   a fascia member mounted to the vehicle and covering the body underlying surface and the venting port to form an appearance surface of the vehicle, wherein the blocking rib extends to a location closely adjacent and slightly spaced apart from the fascia member, and wherein the fascia member is a solid component that does not allow airflow therethrough.

6. The body vent protector assembly of claim 1 wherein the body vent protector includes lower ribs located at or adjacent the lower edge area of the venting port that are horizontally spaced apart forward of the blocking rib and horizontally spaced apart from one another, the ribs fixedly connected to the shroud for supporting the lower edge area of the shroud in spaced relation relative to the venting port.

7. The body vent protector assembly of claim 1 wherein the body vent protector includes a face plate mounted in abutting relation to the body underlying surface, the face plate surrounding the venting port and integrally formed with the shroud and the blocking rib.

8. The body vent protector assembly of claim 7 wherein the body vent protector further includes a lead-in wall portion extending orthogonally from the face plate into the venting port.

9. The body vent protector assembly of claim 8 further including;
a port structure defining a port, the port structure including a projecting portion that is received in the venting port of the body underlying surface and removably received in the lead-in wall portion of the body vent protector.

10. A body vent protector mounted on a vehicle, comprising:
a shroud disposed over at least a portion of a venting port defined by a body underlying surface on the vehicle for inhibiting undesirable matter from interfering with the venting port; and
a blocking rib fixedly connected to the shroud and disposed at or adjacent a rear edge area of the venting port for further inhibiting undesirable matter from interfering with the venting port,
wherein the blocking rib extends orthogonally away from a plane in which the venting port is defined;
wherein the blocking rib extends away from the plane toward a fascia member overlying the body underlying surface, a distal edge of the blocking rib positioned closely adjacent and slightly spaced apart from the fascia member.

11. The body vent protector of claim 10 wherein the blocking rib extends along an entirety of a vertical height of the venting port wherein the vertical height is oriented so as to extend in the same direction as a height of the vehicle.

12. The body vent protector of claim 11 wherein the blocking rib extends vertically upward and vertically below the entirety of the vertical height of the venting port.

13. The body vent protector of claim 10 further including:
a face plate adapted to mount against the body underlying surface, the face plate, the shroud and the blocking rib integrally formed and together defining an aperture open only in a forward and lower direction relative to the venting port, the blocking rib extending orthogonally from the face plate in a direction away from the body underlying surface.

14. The body vent protector of claim 13 further including:
a lead-in structure extending orthogonally from the face plate into the venting port.

15. The body vent protector of claim 13 further including lower side ribs extending from the face plate to the shroud located along the lower edge of the venting port and, the lower side ribs horizontally spaced apart from one another and positioned forward of the blocking rib.

16. A body vent protector for a vehicle, comprising:
a blocking rib arranged to extend vertically along a rear side area of a venting port defined into the vehicle;
a shroud statically positioned laterally over an entire area of the venting port, the shroud and the blocking rib together closing the rear side area and an upper side area of the venting port;
a face plate from which the blocking rib orthogonally projects, the shroud extending from the face plate in the same lateral direction as the blocking rib;
a plurality of lower ribs disposed in horizontally spaced apart relation along a lower side area of the venting port, each of the plurality of lower ribs extending from the face plate to a lower distal edge of the shroud; and
a lead-in structure projecting from the face plate in a direction opposite the blocking rib, the shroud and the plurality of lower ribs.

17. The body vent protector assembly of claim 11 wherein the shroud covers an entirety of a vertical area of the venting port and together with the blocking rib permits airflow communication with the venting port from both a lower edge area of the venting port and a front edge area of the venting port with an outward facing side of the venting port while preventing airflow from the rear edge area and a top edge area, wherein the lower edge area is spaced vertically on the vehicle lower than the upper edge area and the front edge area is spaced horizontally on the vehicle forward of the rear edge area.

18. The body vent protector assembly of claim 16 wherein the shroud covers an entirety of a vertical area of the venting port and together with the blocking rib permits airflow communication with the venting port from both the lower side area of the venting port and a front side area of the venting port with an outward facing side of the venting port while preventing airflow from the rear side area and the top side area, wherein the lower side area is spaced vertically on the vehicle lower than the top side area and the front side area is spaced horizontally on the vehicle forward of the rear side area.

* * * * *